United States Patent
Ohba et al.

(10) Patent No.: US 6,836,387 B2
(45) Date of Patent: Dec. 28, 2004

(54) HARD DISK DRIVE UNIT HAVING A REDUCED SIZE AND COST

(75) Inventors: Koichiro Ohba, Kawasaki (JP);
Takayuki Bitoh, Kawasaki (JP);
Toshiyuki Hachiya, Kawasaki (JP);
Hideaki Kamezawa, Kawasaki (JP);
Kenichi Myokan, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/995,154

(22) Filed: Nov. 27, 2001

(65) Prior Publication Data

US 2002/0191330 A1 Dec. 19, 2002

(30) Foreign Application Priority Data

Jun. 15, 2001 (JP) .......................... 2001-181917

(51) Int. Cl.[7] .................. G11B 17/00; G11B 5/012; G11B 21/08; G11B 5/55
(52) U.S. Cl. ...................... 360/97.01; 360/266
(58) Field of Search .................. 360/97.01, 88, 360/240, 260, 264, 264.1, 265.7, 265.9, 266, 244; D14/496, 348, 363

(56) References Cited

U.S. PATENT DOCUMENTS

| | | | |
|---|---|---|---|
| 4,853,807 A | * | 8/1989 | Trager ..................... 360/72.1 |
| 4,985,793 A | * | 1/1991 | Anderson ................. 360/256.2 |
| 5,034,837 A | * | 7/1991 | Schmitz ................... 360/256.2 |
| 5,175,657 A | * | 12/1992 | Iftikar et al. ................ 360/133 |
| 5,475,549 A | * | 12/1995 | Marder et al. ............ 360/265.8 |
| 5,491,609 A | * | 2/1996 | Dankman et al. ........... 361/683 |
| 5,543,982 A | * | 8/1996 | Takagi et al. ............. 360/97.01 |
| 5,581,127 A | * | 12/1996 | Shinohara .................. 235/380 |
| 5,646,801 A | * | 7/1997 | Boigenzahn et al. ..... 360/97.01 |
| 5,835,311 A | * | 11/1998 | Brooks et al. ............ 360/265.9 |
| D442,956 S | * | 5/2001 | Tseng et al. ................ D14/363 |
| 6,243,228 B1 | * | 6/2001 | Yoshida et al. .......... 360/97.02 |
| 6,278,583 B1 | * | 8/2001 | Adley ....................... 360/244.1 |
| 6,487,053 B1 | * | 11/2002 | Matsumura et al. ...... 360/265.7 |
| 6,529,351 B1 | * | 3/2003 | Oveyssi et al. ........... 360/264.8 |
| 2001/0049210 A1 | * | 12/2001 | Pinteric et al. ............. 439/76.1 |
| 2003/0007294 A1 | * | 1/2003 | McReynolds et al. ... 360/265.9 |
| 2003/0030941 A1 | * | 2/2003 | Lau et al. .................... 360/266 |

OTHER PUBLICATIONS

IBMC, "Conversion of a hard disc drive of the 2.5 inch type into that of a hard disc of the 3.5 inch type for its usage", May 10, 2000, Derwent 2000–530584.*

IBM, Conversion of a hard disc drive of the 2.5 inch type into that of a hard disc drive of the 3.5 inch type for its usage, May 10, 2000, Derwent 2000–530584, RD 433134 A, p. 936.*

Hutchinson, Voice coil motor support for a rigid disc drive integrated with a discrete arm or machine or stacked in a flat shape, Jun. 10, 2000, Derwent 2001/005596, RD 434112 A.*

* cited by examiner

*Primary Examiner*—Julie Anne Watko
(74) *Attorney, Agent, or Firm*—Greer, Burns & Crain, Ltd.

(57) ABSTRACT

A carriage arm and a hard disk drive unit including the carriage arm, where the carriage arm includes a head slider mounting part and a voice coil attachment part integrally formed with each other by a metal plate being press punched so that the head slider mounting part and the voice coil attachment part are arranged opposite to each other with respect to a rotational axis of the carriage arm. Additionally, the head slider mounting part defines a first plane and the voice coil attachment part defines a second plane that is different from the first plane, and where the head slider mounting part and the voice coil attachment part are connected to each other by a bent portion.

9 Claims, 10 Drawing Sheets

FIG. 3A
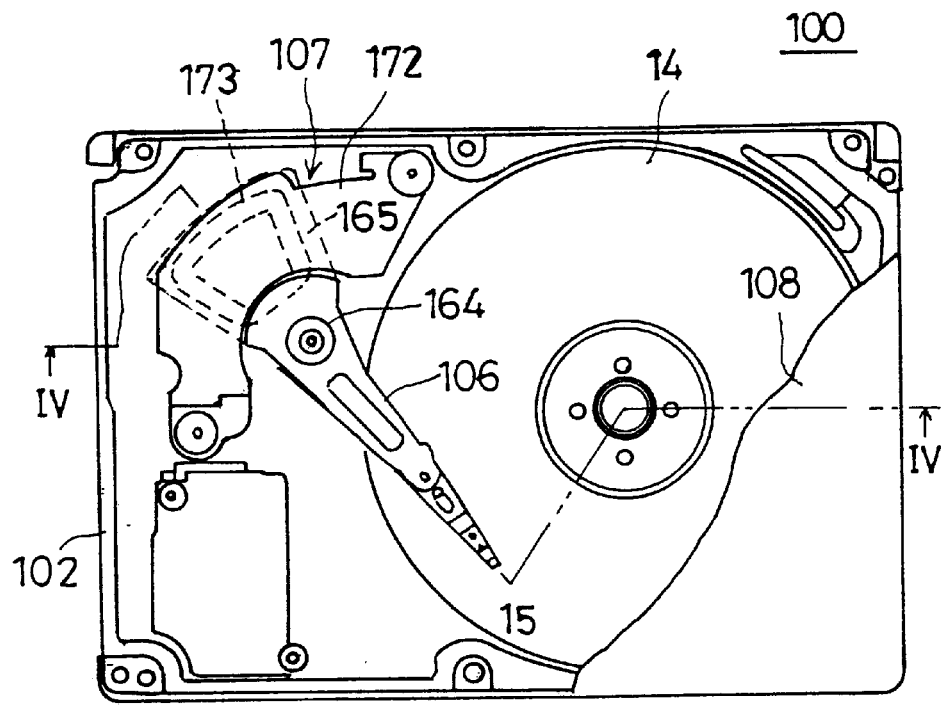
FIG. 3B
FIG. 3C
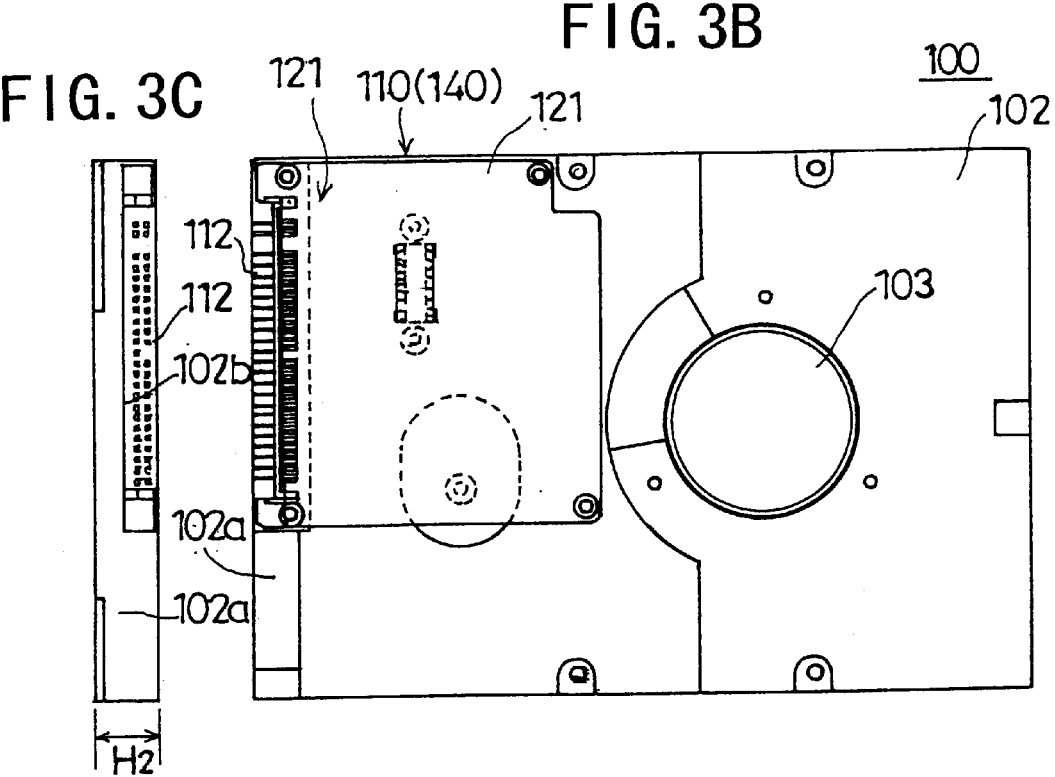

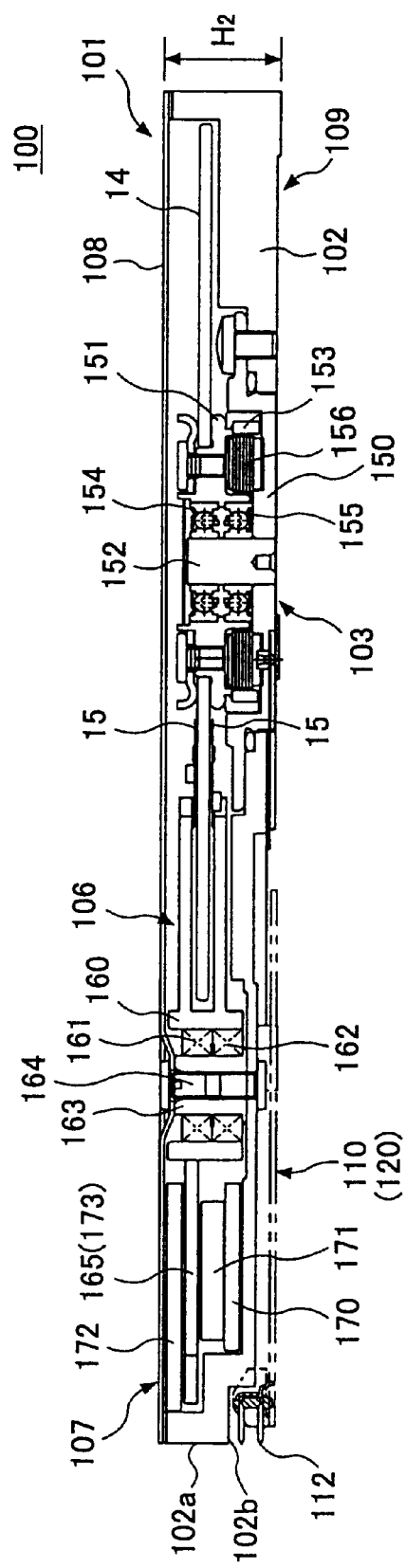

HARD DISK DRIVE UNIT HAVING A REDUCED SIZE AND COST

BACKGROUND OF THE INVENTION

1. Field of the Invention

The present invention generally relates to a hard disk drive unit and, more particularly, to a 3.5-inch hard disk drive unit using a hard disk having a diameter of 3.5 inches.

2. Description of the Related Art

FIG. 1 is a cross-sectional view of a conventional 3.5-inch hard disk drive unit 10. The hard disk drive unit 10 has a mechanism part 11 and an electronic circuit part 30.

The mechanism part 11 comprises: a base 12; a motor 13 fixed to the base 12 for rotating a hard disk 14 having a diameter of 3.5 inches and fixed to the motor 13; a carriage arm 16 having a head slider 15 at an extreme end thereof; a magnetic circuit 17 for reciprocally moving the carriage arm 16; and a cover 18 covering the hard disk 14, the carriage arm 16 and the magnetic circuit 17. In FIG. 1, although only one hard disk 14 is shown, a storage capacity can be increased by increasing the number of hard disks. Manufacturers of hard disk drive units provide versatile apparatus lineups by changing the number of hard disks in this way using the common parts as much as possible.

A hard disk drive unit 10 further comprises a printed circuit board unit 20 containing a printed circuit board 21. A plurality of electronic parts are mounted on a surface of a printed circuit board 21, and the connector 22 is mounted in the end of a printed circuit board 21. The printed circuit board 20 is fixed to an undersurface of a base 12, and a connector 22 is exposed at an end surface of the hard disk drive unit 10. The height H1 of the hard disk drive unit 10 is 1 inch. The printed circuit board unit 20 constitutes an electronic circuit part 30.

As shown in FIG. 2, the electronic circuit part 30 comprises an interface part 31, which interfaces with a higher order system 40, and a control part 32, which controls an operation of the mechanism part 101 and data reading and the writing operations. As shown in FIG. 2, the printed circuit board unit 20 comprises: a hard disk controller (HDC) 51; a RAM 52 as a buffer for temporarily storing data; a ROM for storing programs for controlling an MPU 54; a read channel 55; a servo controller (SVC) 56; and drivers 57 and 58.

The interface part 31 comprises a hard disk controller (HDC) 51 for a 3.5-inch hard disk drive unit, and a connector 22 for a 3.5-inch hard disk drive unit. A control part 32 consists of the MPU 54 and the ROM 53. The hard disk 14 is rotated by the motor 13 at a high speed. The carriage arm 16 is reciprocally rotatable by the magnetic circuit 17. The head slider 15 is moved in a radial direction of the hard disk 14 while being floated above the surface of the hard disk 14 so as to scan a target track to carry out information writing and reading. The read reproduction signal is supplied to a head IC 19 so as to be amplified, and, thereafter, the amplified signal is supplied to a read channel 55.

The 3.5-inch hard disk drive unit 10 having the above-mentioned composition has a feature that a storage capacity is large since the diameter of the hard disk 14 is as large as 3.5 inches. Moreover, the 3.5-inch hard disk drive unit 10 is operated by an input power supply voltage of 12V.

The 3.5-inch hard disk drive unit 10 has a space having a height of 1 inch, and also has a connector into which the connector 22 for 3.5-inch hard disk drive units fits so as to be incorporated into an apparatus such as a personal computer which can supply an input power supply voltage of 12V. Moreover, for example, the 3.5-inch hard disk drive unit 10 is used by being incorporated into a digital television set or a digital audio apparatus.

Although the above-mentioned 3.5-inch hard disk drive unit 10 has a large storage capacity as compared with a 2.5-inch hard disk drive unit, there is a problem in that a size is large and a power consumption is also large. On the contrary, although a 2.5-inch hard disk drive unit has a smaller size and less power consumption than the 3.5-inch hard disk drive unit, there is a problem in that a storage capacity is small.

Furthermore, the same housing is used for both a hard disk drive unit having a single hard disk and a hard disk drive unit having a plurality of hard disks. Therefore, there is a large empty space in the housing of the hard disk drive unit having a single hard disk. Moreover, in order to balance a rotation of a carriage arm, a dummy head is provided, which causes a problem that there is an unnecessary part cost.

Moreover, the above-mentioned problem has been closed-up since a sufficiently large storage capacity can be obtained with less number of hard disks and the demand for a hard disk drive unit of a single 3.5-inch hard disk has been increased in association with the high density recording in recent years.

SUMMARY OF THE INVENTION

It is a general object of the present invention to provide an improved and useful hard disk drive unit in which the above-mentioned problems are eliminated.

A more specific object of the present invention is to provide a 3.5-inch hard disk drive unit which has a small power consumption and can be incorporated into a small space.

In order to achieve the above-mentioned objects, there is provided according to one aspect of the present invention a hard disk drive apparatus comprising: a mechanism part provided in a housing, the mechanism part comprising a hard disk having a diameter of 3.5 inches, a motor for rotating the hard disk, a carriage arm having a head slider mounted on an end thereof and a magnetic circuit reciprocally rotates the carriage arm; and an electronic circuit part controlling the mechanism part, the electronic circuit part having an interface part, which is prepared for a 2.5-inch hard disk drive unit, so as to interface with an upper order system.

According to the above-mentioned invention, the hard disc drive unit has a storage capacity larger than that of a 2.5-inch hard disk drive unit. Additionally, a power consumption of the hard disk drive unit is less than a conventional 3.5-inch hard disk unit. Further the hard disk drive unit having a 3.5-inch disk can be connected to a higher order system of a 2.5-inch hard disk drive unit.

Additionally, there is provided according to another aspect of the present invention a hard disk drive unit comprising: a housing having a height of about ½ inch; and a mechanism part provided in the housing, the mechanism part comprising a hard disk having a diameter of 3.5inches, a motor for rotating the hard disk, a carriage arm having a head slider mounted on an end thereof and a magnetic circuit reciprocally rotates the carriage arm.

According to the above-mentioned invention, the hard disk drive unit having a 3.5-inch hard disk can be incorporated into a space having a height of ½ inch. Thus, the hard disk drive unit according to the present invention can replace a 2.5-inch hard disk drive unit.

Additionally, there is provided according to another aspect of the present invention a hard disk drive unit comprising: a housing having a substantially rectangular horizontal cross section; a mechanism part provided in the housing, the mechanism part comprising a hard disk having a diameter of 3.5 inches, a motor for rotating the hard disk, a carriage arm having a head slider mounted on an end thereof and a magnetic circuit reciprocally rotates the carriage arm; an electronic circuit part provided in the housing so as to control the mechanism part; and a connector exposed on a side surface of the housing corresponding to a long side of the rectangular shape so as to connect the electronic circuit part to an external device.

According to the above-mentioned invention, two kinds of 3.5-inch hard disk units can be provided, one being the 3.5-inch hard disk drive unit having a connector exposed on the short side and the other being the 3.5-inch hard disk drive unit having a connector exposed on the long side. Therefore, the restrictions in the arrangement of the connector of a 2.5-inch hard disk drive unit for the higher order system are relaxed.

Additionally, there is provided according to another aspect of the present invention, a hard disk drive unit comprising: a housing; a mechanism part provided in the housing, the mechanism part comprising a hard disk, a motor for rotating the hard disk, a carriage arm having a head slider mounted on an end thereof and a magnetic circuit reciprocally rotates the carriage arm; and an electronic circuit part provided in the housing so as to control the mechanism part, wherein the carriage arm includes a head slider mounting part and a voice coil attachment part integrally formed with each other by a metal plate being press punched so that the head slider mounting part and the voice coil attachment part are arranged opposite to each other with respect to a rotational axis of the carriage arm.

According to the present invention, since the carriage arm has a single integrated construction which can be formed by press punching a metal plate. Thus, a manufacturing cost of the carriage arm can be reduced, which results in a cost reduction of the hard disc drive unit.

Other objects, features and advantages of the present invention will become more apparent from the following detailed description when read in conjunction with the following drawings.

BRIEF DESCRIPTION OF THE DRAWINGS

FIG. 3A is a plan view of a 3.5-inch hard disk drive unit according to a first embodiment of the present invention;

FIG. 3B is a bottom view of the 3.5-inch hard disk drive unit shown in FIG. 3A;

FIG. 3C is a side view of the 3.5-inch hard disk drive unit shown in FIG. 3B;

FIG. 4 is a cross-sectional view of the 3.5-inch hard disk drive unit according to the first embodiment of the present invention taken along a line IV—IV of FIG. 3A;

DETAILED DESCRIPTION OF THE PREFERRED EMBODIMENTS

Figure 1:
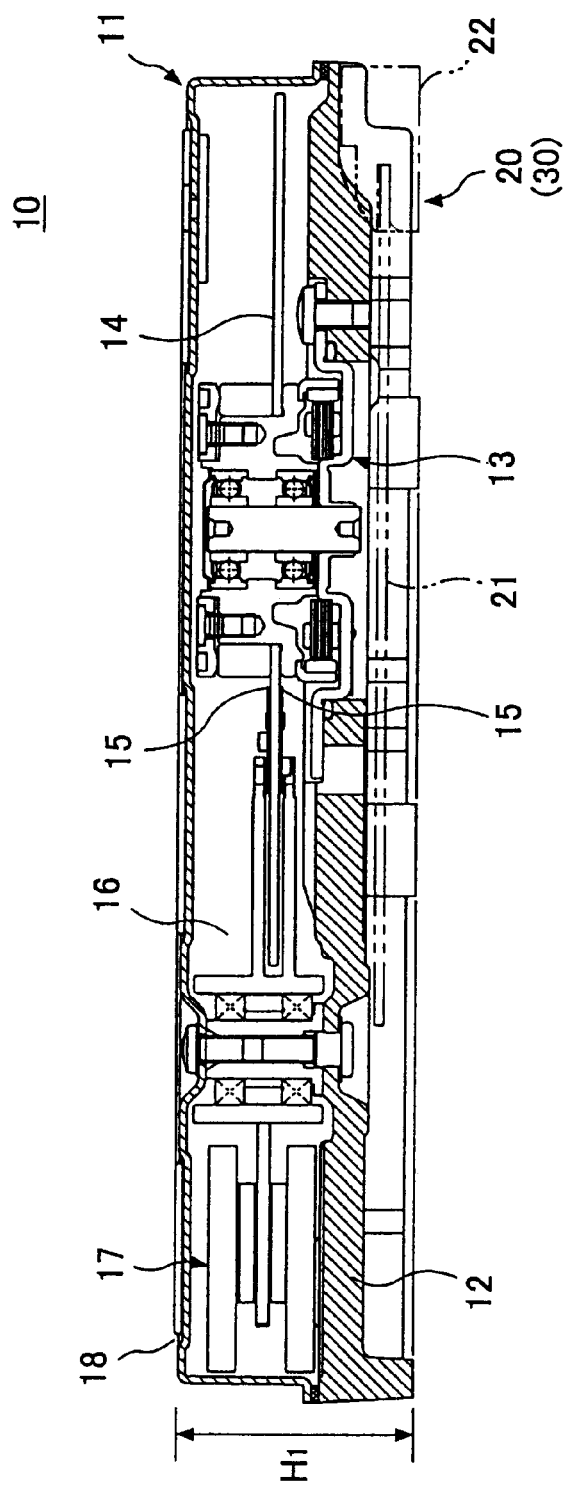
FIG. 1 is a cross-sectional view of a conventional 3.5-inch hard disk drive unit.

A description will now be given of a first embodiment of the present invention. FIGS. 3A to 3C, FIG. 4 and FIG. 5 show a 3.5-inch hard disk drive unit 100 according to the first embodiment of the present invention.

The hard disk drive unit 100 comprises: a mechanism part 101 and an electronic circuit part 120. As shown in FIGS. 3A to 3C and FIG. 4, the mechanism part 101 comprises: a base 102 having a shallow box shape; a motor 103 fixed to the base 102 for rotating a hard disk; one hard disk 14 having a diameter of 3.5 inches and fixed to the motor 103; a carriage arm 106 having a head slider 15 at an extreme end thereof; a magnetic circuit 107 reciprocally rotating the carriage arm 106; and a cover 108 having a flat plate shape so as to cover the hard disk 14, the carriage arm 106 and the magnetic circuit 107. The base 102 and the cover 108 together constitute a housing 109.

The motor 103 for hard disk rotation consists of a stator 150 and a rotor 151, as shown in FIG. 4. The stator 150 has a fixed shaft 152 in the center, and a plurality of coils 156 are circumferentially arranged on a peripheral portion of the stator 150. The stator 150 is fixed to the base 102. The rotor 151 has an annular magnet 153, and is supported by the fixed shaft 152 via two bearing members 154 and 155. The bearing members 154 and 155 are arranged close to each other. The thickness of the motor 103 for hard disk rotation is thinner than that of the motor 13 for hard disk rotation provided in the conventional 3.5-inch hard disk drive unit 10 shown in FIG. 1.

The motor 103 for hard disk rotation is operated by 5V, which is an input power supply voltage of a 2.5-inch hard disk drive unit. The carriage arm 106 has a cylinder part 160, as shown in FIG. 4. Bearing members 161 and 162 and a bearing sleeve 163 are incorporated into a cylinder part 160. The bearing sleeve 163 fits on a shaft 164 which is fixed to the base 102, and the cylinder part 160 is rotatable while being supported by the bearing members 161 and 162. The bearing members 161 and 162 are arranged close to each other. The cylinder part 160 is thinner than the corresponding cylinder part provided in the conventional 3.5-inch hard disk drive unit 10 shown in FIG. 1.

As shown in FIG. 3A, a furcate part 165 for fixing the voice coil 173 extends from the cylinder part 160 in a direction opposite to the carriage arm 106. As shown in FIG. 3A and FIG. 4, the magnetic circuit 107 comprises a yoke 170, a permanent magnet 171 fixed on the yoke 170 and a yoke 172 facing the permanent magnet 171 with a gap therebetween. The magnetic circuit 107 is fixed on the base 102. A rectangular-shaped voice coil 173 fixed to the furcate part 165 is provided in the gap between the permanent magnet 171 and the yoke 172.

In the present embodiment, a permanent magnet to be arranged above the voice coil 173 is omitted, and, thus, the thickness of the magnetic circuit 107 according to the present embodiment is smaller than the thickness of the magnetic circuit 17 provided in the conventional 3.5-inch hard disk drive unit 10 shown in FIG. 1. The magnetic circuit 107 is operated by an input power supply voltage of 5V.

As mentioned above, the motor 103 for hard disk rotation, the carriage arm 106 and the magnetic circuit 107 are thinner than the motor 13 for hard disk rotation, the carriage arm 16 and the magnetic circuit 17 of the conventional 3.5-inch hard disk drive unit 10 shown in FIG. 1, respectively. Therefore, a height (thickness) H2 of the 3.5-inch hard disk drive unit 100 according to the present embodiment can be as small as ½ inch, which is one half of the height of the conventional hard disk drive unit. That is, the 3.5-inch hard disk drive unit 100 according to the present embodiment has the same height as the height of a regular 2.5-inch hard disk drive unit.

The printed circuit board unit 110 includes a printed circuit board 111 on which a plurality of electronic products are mounted. A connector 112 is mounted at an end of the printed circuit board 111. The connector 112 is identical to a connector to be provided to a 2.5-inch hard disk drive unit. The printed circuit board unit 110 is fixed to the undersurface of the base 102. A connector 112 is exposed on a side surface 102a of the base 102 in a state in which the connector 112 is fit in a cutout part 102b formed in the side surface 102a of the short side of the base 102 of the hard disk drive unit 100.

Figure 2:
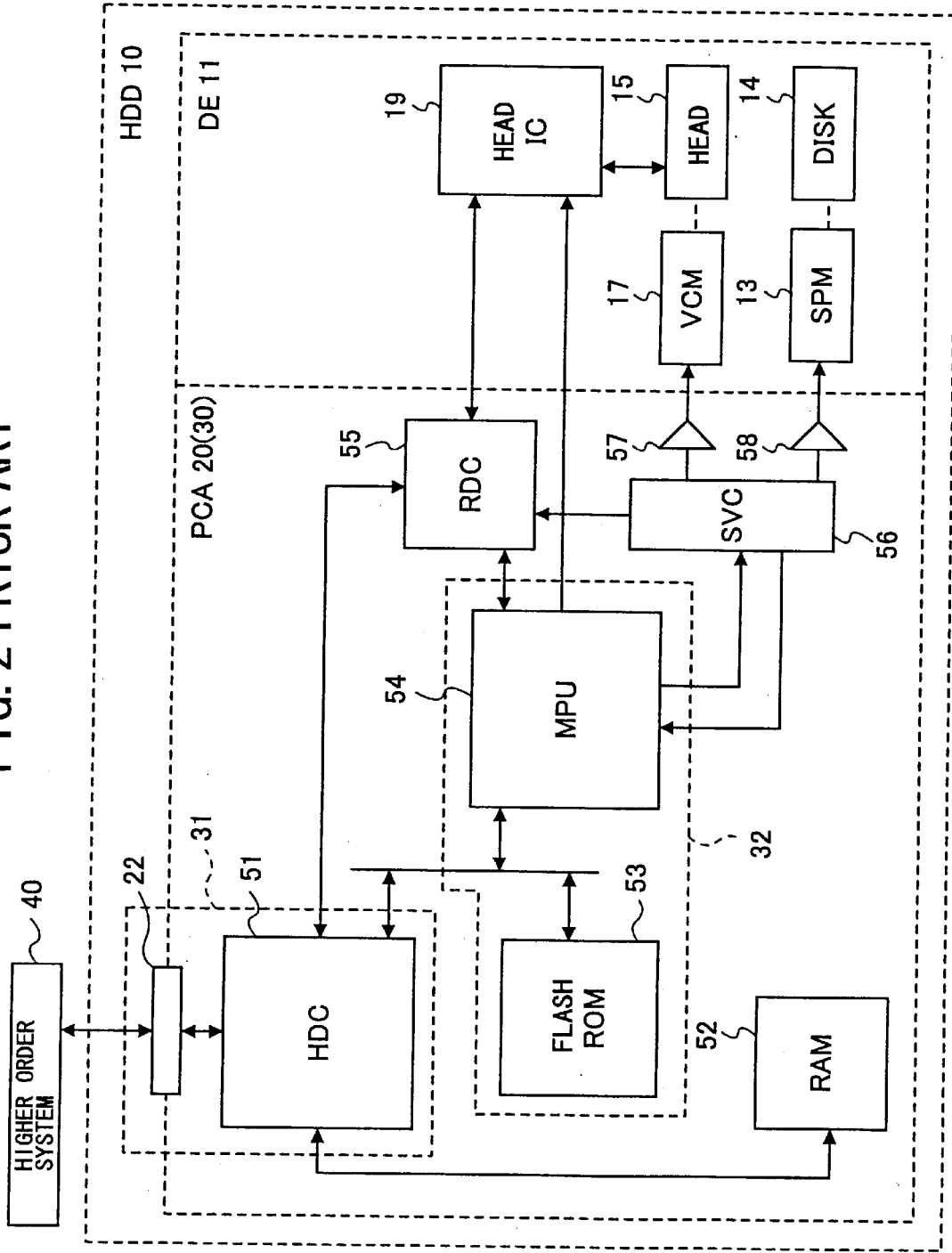
FIG. 2 is a block diagram of the 3.5-inch hard disk drive unit shown in FIG. 1.
Figure 5:
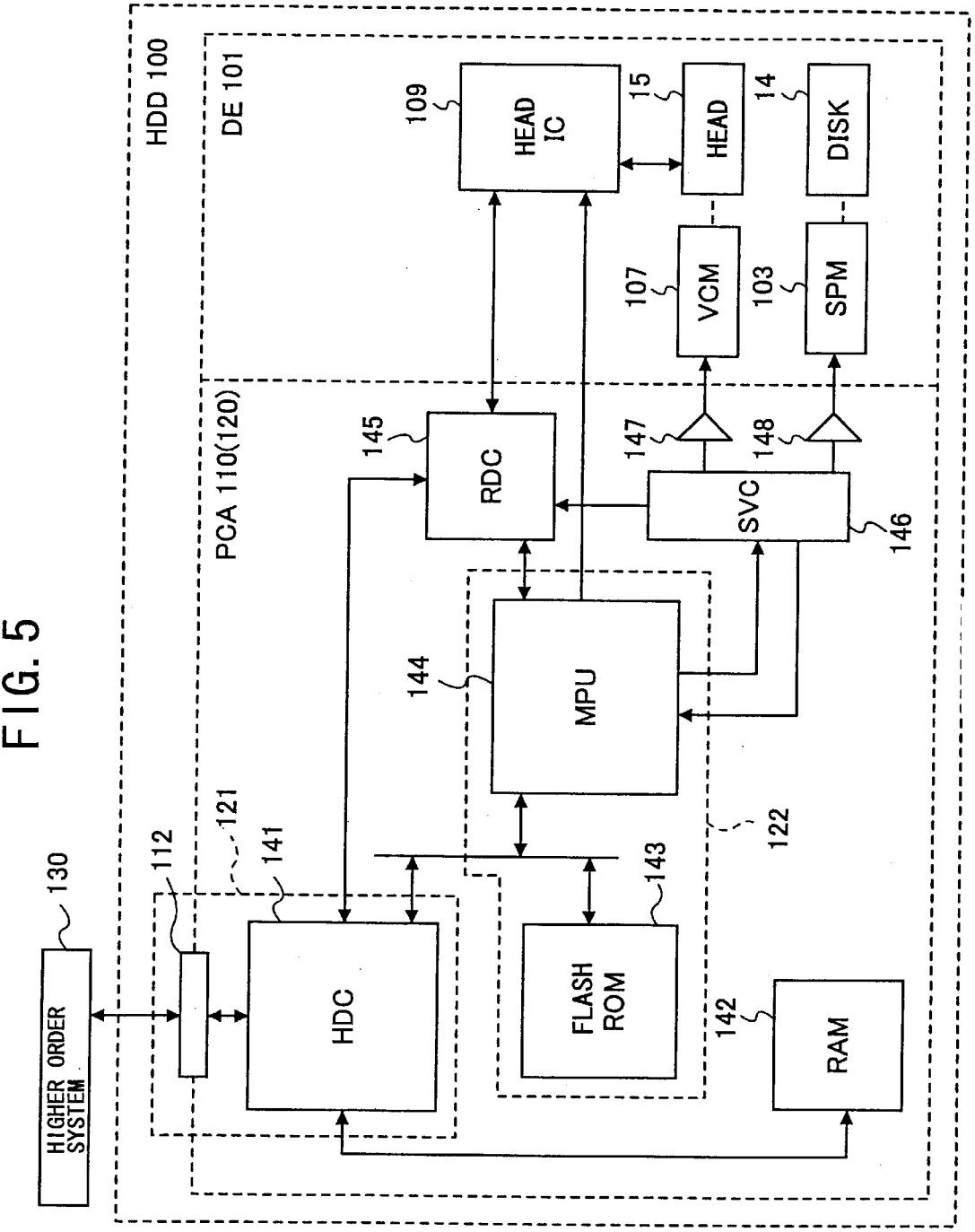
FIG. 5 is a block diagram of the 3.5-inch hard disk drive unit according to the first embodiment of the present invention.

The printed circuit board unit 110 constitutes an electronic circuit part 120. As shown in FIG. 2, the electronic circuit part 120 comprises an interface part 121 connected to the higher order system 130 and a control part 122 which controls an operation of the mechanism part 101 and data reading and writing operations. As shown in FIG. 2, the printed circuit board unit 110 comprises: a hard disk controller (HDC) 141; a RAM 142 as a buffer for temporarily storing data; an MPU 144; a ROM 143 storing programs for controlling the MPU 144; a read channel 145 which performs modulation and demodulation of data; a servo controller (SVC) 146; and drivers 147 and 148. The interface part 121 for a 2.5-inch hard disk drive unit comprises a hard disk controller (HDC) 141 for a 2.5-inch hard disk drive unit and a connector 112 for a 2.5-inch hard disk drive unit. The control part 122 is constituted by the MPU 144 and the ROM 143.

As mentioned above, the height H2 of the 3.5-inch hard disk drive unit 100 is ½ inch, which is one half of the height of the conventional apparatus. That is, the height H2 of the 3.5-inch hard disk drive unit 100 is the same as the height of a regular 2.5-inch hard disk drive unit. Therefore, the 3.5-inch hard disk drive unit 100 can be incorporated into a space of an apparatus such as a notebook type personal computer, a game apparatus, a copy machine or a printer, where the 2.5-inch hard disk drive unit has been incorporated. Then, the connector 112 is connected to the connector of the higher order system 130, and the 3.5-inch hard disk drive unit 100 is operated by an input power supply voltage of 5V.

The hard disk 14 is rotated at 3600 rpm by the motor 103. The carriage arm 106 is reciprocally rotated by the magnetic circuit 107. The head slider 15 is moved in a radial direction of the hard disk 14 while floating above the upper and lower surfaces of the hard disk 14 so as to scan a target track to carry out writing and reading of information. The read reproduction signal is supplied to and amplified by the head IC 109. Then, the amplified reproduction signal is supplied to the read channel 145. The rotational speed of the hard disk 14 is 3600 rpm, which is a lower than a normal rotational speed. Therefore, the operation sound of the 3.5-inch hard disk drive unit 100 according to the present embodiment is lower than the operation sound of the conventional 3.5-inch hard disk drive unit 10.

The 3.5-inch hard disk drive unit 100 according to the present embodiment can operate by an input power supply voltage of 5V, thereby consuming less electric power than the conventional 3.5-inch hard disk drive unit 10. Moreover, since the diameter of the hard disk 14 is as large as 3.5 inches, the storage capacity of the 3.5-inch hard disk drive unit 100 is larger than that of a 2.5-inch hard disk drive unit.

Figure 6A:
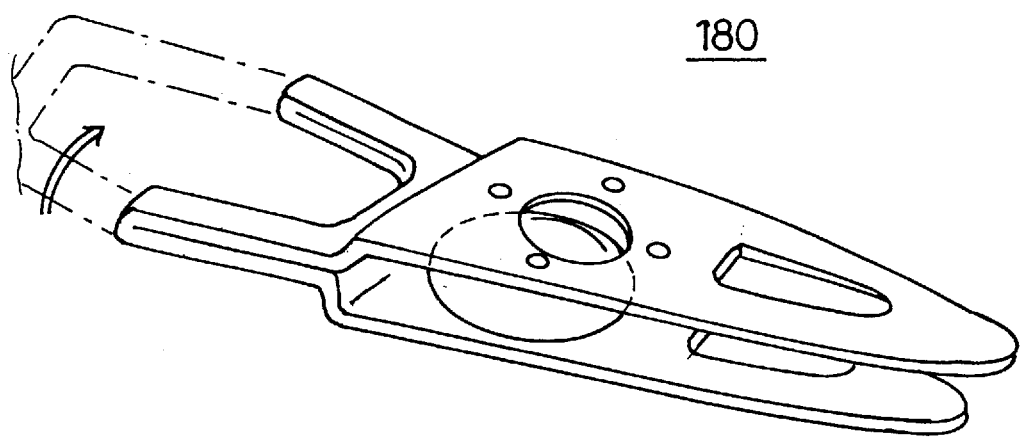
FIG. 6A is a perspective view of a variation of a carriage arm shown in FIG. 3A.
Figure 6B:
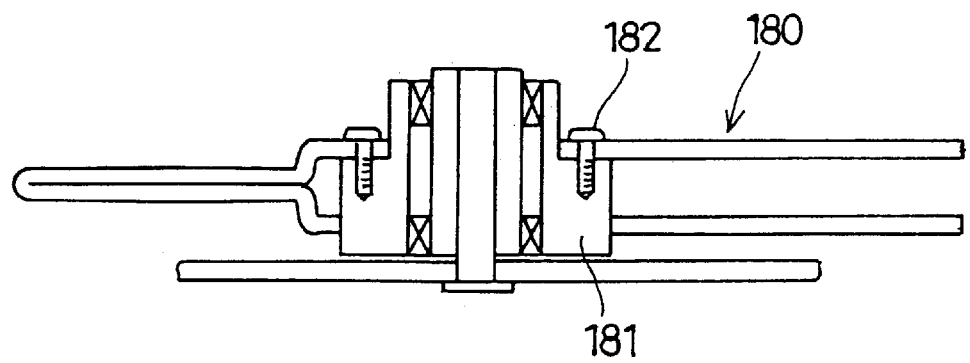
FIG. 6B is a side view of the carriage arm shown in FIG. 6A.

FIG. 6A is a perspective view showing a carriage arm 180, which is a variation of the carriage arm 106. The carriage arm 180 is formed by folding an elongated metal plate member fabricated by press punching. The carriage arm 180 is inexpensive as compared to a carriage arm made by die-casting. As shown in FIG. 6B, the carriage arm 180 is fixed to a stepwise cylindrical sleeve 181 with screws 182.

Figure 7:
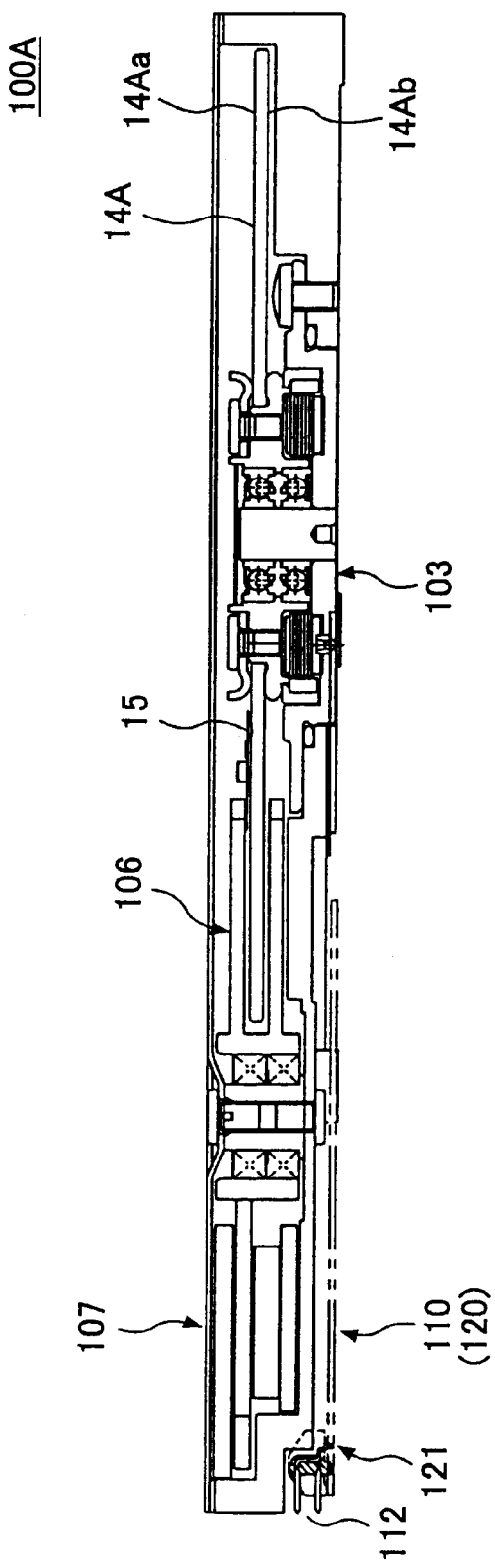
FIG. 7 is a cross-sectional view of a 3.5-inch hard disk drive unit according to a second embodiment of the present invention.

A description will now be given, with reference to FIG. 7, of a second embodiment of the present invention. FIG. 7 is a cross-sectional view of a 3.5-inch hard disk drive unit 100A according to the second embodiment of the present invention.

The hard disk drive unit 100A has a small storage capacity as compared to the above-mentioned 3.5-inch hard disk drive unit 100, and, thereby, a manufacturing cost of the hard disk drive unit 100A is reduced. The hard disk drive unit 100A is different from the above-mentioned 3.5-inch hard disk drive unit 100 in the following points. The number of the head sliders 15 is one, and the head slider 15 faces an upper surface 14Aa of the hard disk 14A. In the hard disk 14A, only the upper surface 14Aa is a magnetic surface, and has a high degree of flatness. The lower surface 14Ab of the hard disk 14A is not a magnetic surface, and its degree of flatness is not so high.

Therefore, compared with the above-mentioned hard disk 14, the hard disk 14A according to the present embodiment can be manufactured with a small number of manufacturing processes, and a yield rate is improved and low cost can be achieved. Therefore, a manufacturing cost of the hard disk drive unit 100A can be reduced by elimination of one of the head sliders 15 and use of the inexpensive hard disk 14A. It should be noted that the hard disk drive unit 100A has the interface part 121 for a 2.5-inch hard disk drive unit.

Figure 8A:
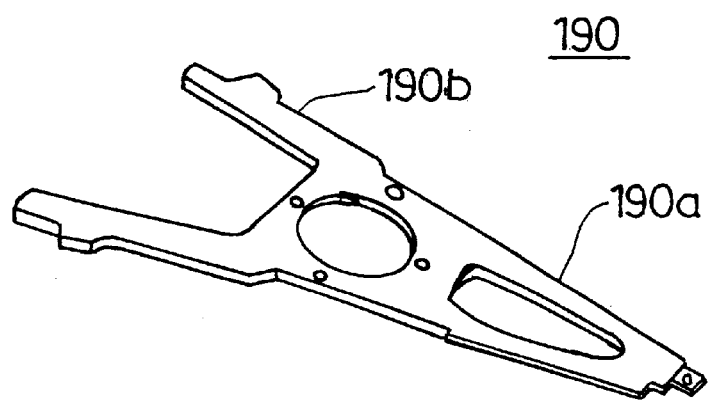
FIG. 8A is a perspective view of a variation of a carriage arm shown in FIG. 7.
Figure 8B:
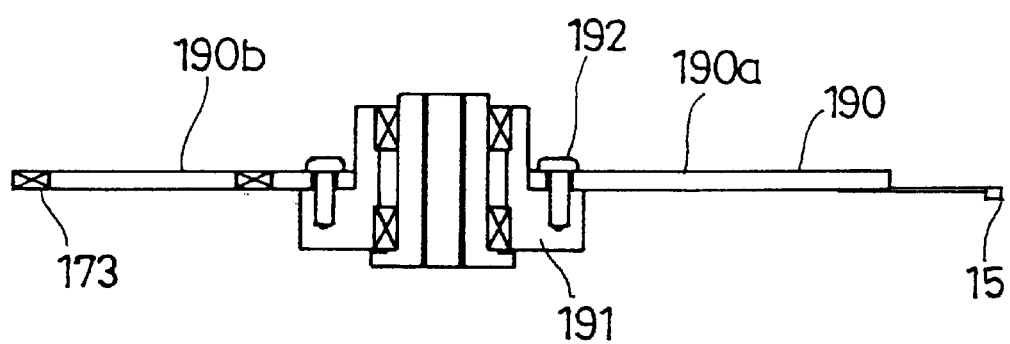
FIG. 8B is a side view of the carriage arm shown in FIG. 8A.

FIG. 8A is a perspective view showing a carriage arm 190, which is a variation of the carriage arm 106 shown in FIG. 7. The carriage arm 190 has a head slider mounting part 190a and a voice coil attachment part 190b integrally formed with each other. The head slider mounting part 190a and the voice coil attachment part 190b are arranged on opposite sides with respect to a rotational center of the carriage arm 190. The carriage arm 190 is a flat member, and can be fabricated by press punching. The carriage arm 190 is inexpensive as compared to a carriage arm made by die-casting. The carriage arm 190 is fixed to a stepwise cylindrical sleeve 191 with screws 192, as shown in FIG. 8B.

Figure 9A:
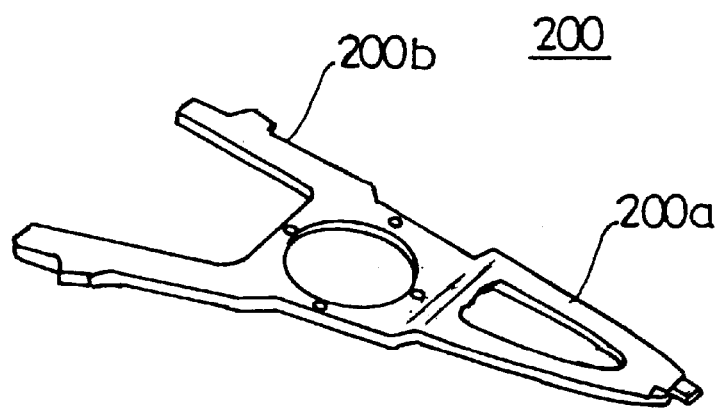
FIG. 9A is a perspective view of another variation of the carriage arm shown in FIG. 7.
Figure 9B:
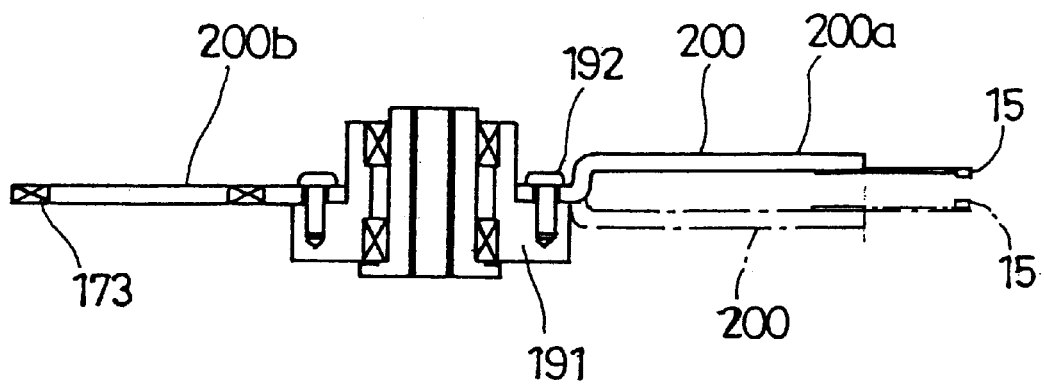
FIG. 9B is a side view of the carriage arm shown in FIG. 9A.

FIG. 9A is a perspective view of a carriage arm 200, which is another variation of the carriage arm 106 shown in FIG. 7. The carriage arm 200 comprises a head slider mounting part 200a and a voice coil attachment part 200b. The head slider mounting part 200a and the voice coil attachment part 200b are arranged on opposite sides with respect to a rotational center of the carriage arm 200. The carriage arm 200 is formed by press punching, and is bent in the middle thereof. The carriage arm 200 is inexpensive as compared to the carriage arm made by die-casting. The carriage arm 200 is fixed to the stepwise cylindrical sleeve 191 with screws 192, as shown in FIG. 9B. If the carriage arm 200 is fixed to the sleeve 191 upside down, the carriage arm 200 is arranged as indicated by double dashed chain lines in FIG. 9B, and the thus-arranged carriage arm 200 is applicable to a hard disk of which lower surface is a magnetic surface.

Figure 10A:
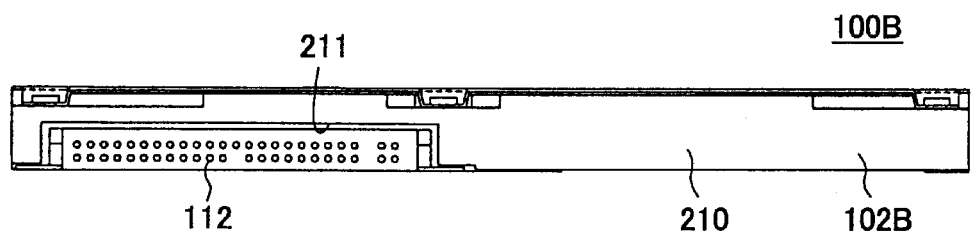
FIG. 10A is a side view of a 3.5-inch hard disk drive unit according to a third embodiment of the present invention.
Figure 10B:
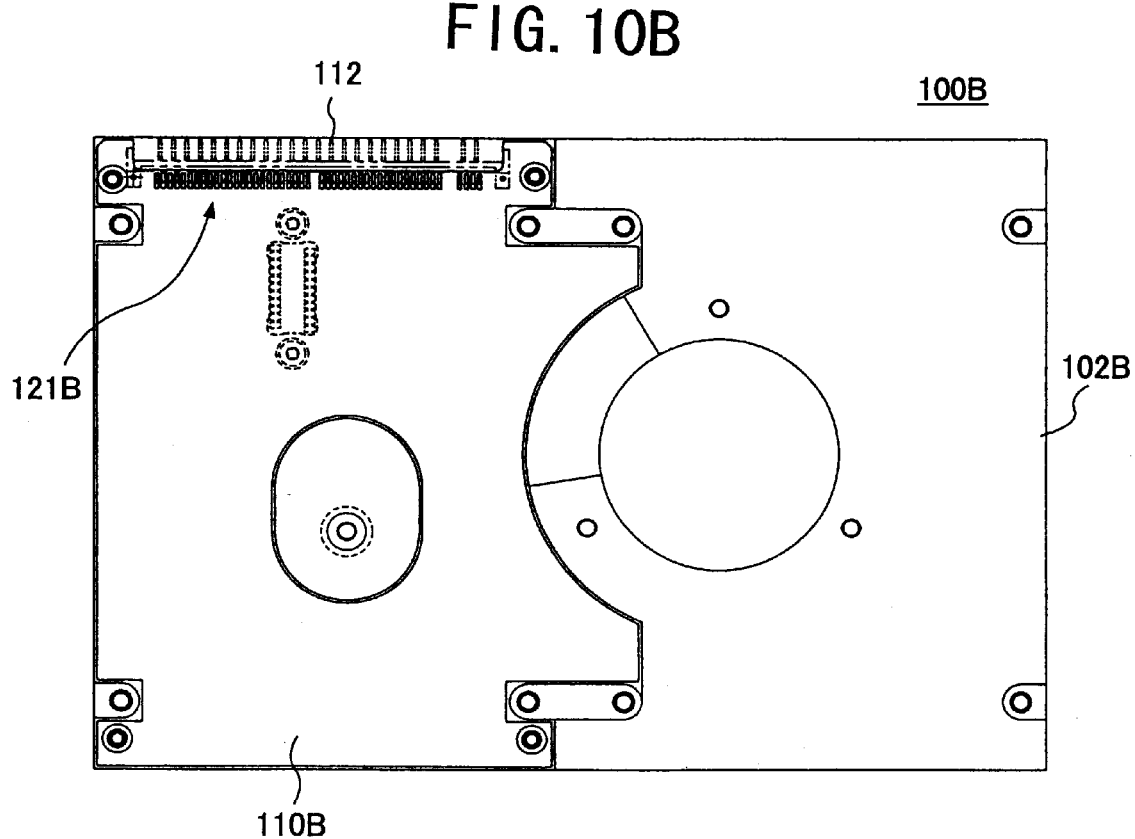
FIG. 10B is a bottom view of the 3.5-inch hard disk drive unit shown in FIG. 10A.

A description will now be given, with reference to FIG. 10A and 10B, of a third embodiment of the present invention. FIG. 10A is a side view of a 3.5-inch hard disk drive unit 100B according to the third embodiment of the present invention, and FIG. 10B is a bottom view of the 3.5-inch hard disk drive unit 100B.

The 3.5-inch hard disk drive unit 100B is different from the above-mentioned 3.5-inch hard disk drive unit 100 with respect to a printed circuit board unit 110B and a base 102B. In the printed circuit board unit 110B, an interface part 121B for a 2.5-inch hard disk drive unit is different from the interface part 121 shown in FIG. 4. A cutout part 211 corresponding to the connector 112 is formed in the side surface 210 of the base 102B in a portion close to the carriage arm 106 in a longitudinal direction in the 3.5-inch hard disk unit 100B. The printed circuit board unit 110B is secured to a bottom surface of the base 102 by screws. The connector 112 of the interface part 121B for a 2.5-inch hard disk drive unit fits in the above-mentioned cutout part 211. The connector 112 is exposed on the side surface 210 of the 3.5-inch hard disk drive unit 100B.

Thereby, two kinds of 3.5-inch hard disk units can be provided, one being the 3.5-inch hard disk drive unit according to the first embodiment, which has a connector exposed on the short side and the other being the 3.5-inch hard disk drive unit according to the third embodiment of the present invention, which has a connector exposed on the long side. Therefore, the restrictions in the arrangement of the connector of a 2.5-inch hard disk drive unit for the higher order system are relaxed.

The present invention is not limited to the specifically disclosed embodiments, and variations and modifications may be made without departing from the scope of the present invention.

The present application is based on Japanese priority application No. 2001-181917 filed on Jun. 15, 2001, the entire contents of which are hereby incorporated by reference.

What is claimed is:

1. A hard disk drive unit comprising:

a housing;

a mechanism part provided in said housing, the mechanism part comprising a hard disk, a motor for rotating said hard disk, a carriage arm having a head slider mounted on an end thereof and a magnetic circuit that reciprocally rotates said carriage arm; and an electronic circuit part provided in said housing so as to control said mechanism part, wherein said carriage arm includes a head slider mounting part and a voice coil attachment part integrally formed with each other by a metal plate being press punched so that said head slider mounting part and said voice coil attachment part are arranged opposite to each other with respect to a rotational axis of said carriage arm; and further wherein said head slider mounting part defines a first plane and said voice coil attachment part defines a second plane that is different from said first plane, and where said head slider mounting part and said voice coil attachment part are connected to each other by a bent portion.

2. The hard disk drive unit as claimed in claim 1, wherein only one hard disk is provided in said mechanism part.

3. The hard disk drive unit as claimed in claim 2, wherein only one carriage arm is provided in said mechanism part.

4. The hard disk apparatus as claimed in claim 3, wherein only one head slider is provided in said mechanism part.

5. The hard disk drive unit as claimed in claim 1, wherein said bent portion is located on the same side of said rotational axis as said head slider mounting part.

6. The hard disk drive unit as claimed in claim 1, wherein said bent portion is located on the same side of said rotational axis as said voice coil attachment part.

7. The hard disk drive unit as claimed in claim 6, wherein said voice coil attachment part includes two layers connected to each other by a folded portion.

8. The hard disk drive unit as claimed in claim 1, wherein said carriage arm is connected to said rotational axis by a cylindrical sleeve, and further wherein said cylindrical sleeve includes an annular step upon which said carriage arm is attached.

9. A carriage arm configured and arranged to be provided in a hard disk drive unit, the carriage arm comprising:

a head slider mounting part for mounting a head slider; and a voice coil attachment part for attaching a voice coil to move said carriage arm, wherein said carriage arm is formed by press punching a metal plate so that said head slider mounting part and said carriage arm attachment part are integrally formed with each other by being arranged on opposite sides with respect to a rotational axis of said carriage arm; and further wherein said head slider mounting part defines a first plane and said voice coil attachment part defines a second plane that is different from said first plane, and where said head slider mounting part and said voice coil attachment part are connected to each other by a bent portion.

* * * * *